Figure 1:
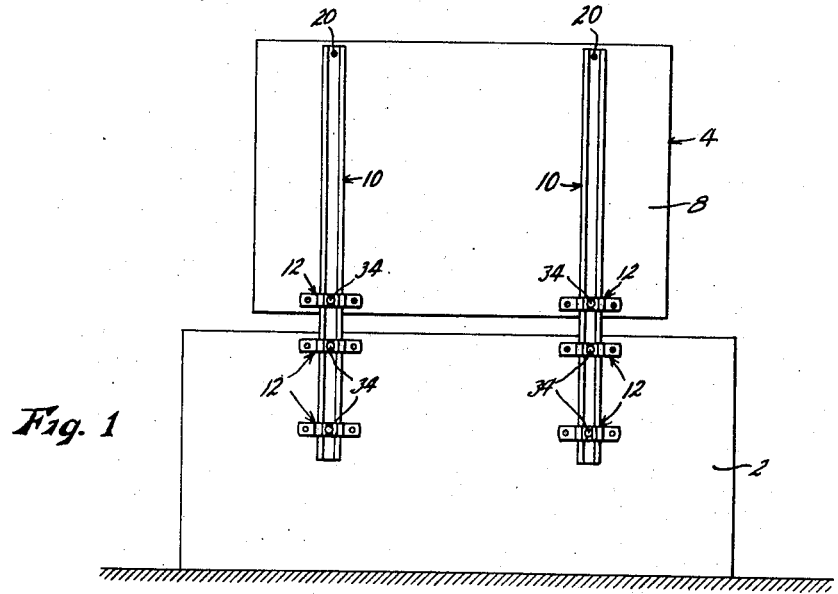

July 7, 1959

B. E. COUSINS 2,893,666

MOUNTING FOR MIRRORS AND THE LIKE

Filed May 9, 1956

INVENTOR.
Boyd E. Cousins
BY Hamilton & Hamilton
Attorneys.

United States Patent Office 2,893,666
Patented July 7, 1959

2,893,666

MOUNTING FOR MIRRORS AND THE LIKE

Boyd E. Cousins, Kansas City, Mo.

Application May 9, 1956, Serial No. 583,834

5 Claims. (Cl. 248—28)

This invention relates to new and useful improvements in mountings for mirrors and the like, and has as one of its objects the provision of a mounting comprising channel-shaped standards which are adjustably movable through clamp brackets attached to the mirror backing and to the fruniture piece to which the mirror is to be mounted, whereby the elevation of the mirror may be freely adjusted.

Another object is the provision of a mounting of the class described wherein the clamping action occurs entirely between the channels and the brackets, applying no strain either to the mirror or furniture parts, or to the attaching means by which the brackets are affixed to said furniture.

A further object is the provision of a mirror mounting of the class described having a minimum projection outwardly from the back of the mirror and furniture, whereby in a room having normal wall baseboards, the furniture may be pushed against said baseboard without danger that the mirror mounting will gouge or mar the wall.

Other objects are extreme simplicity and economy of construction, involving a minimum number of parts, efficiency and dependability of operation, and adaptability for use in many applications.

Figure 2:
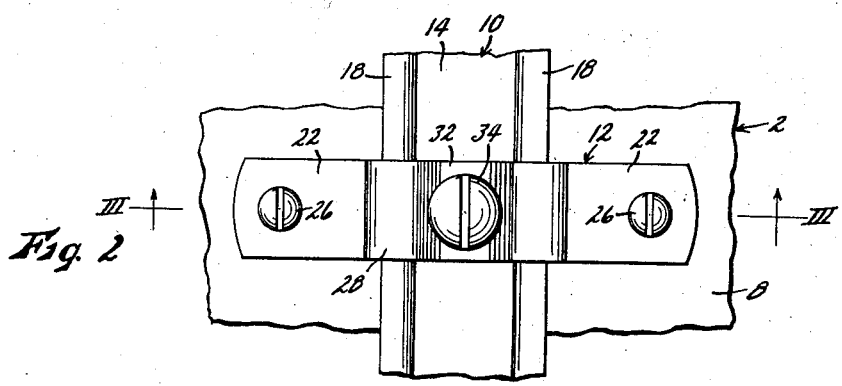
Figure 3:
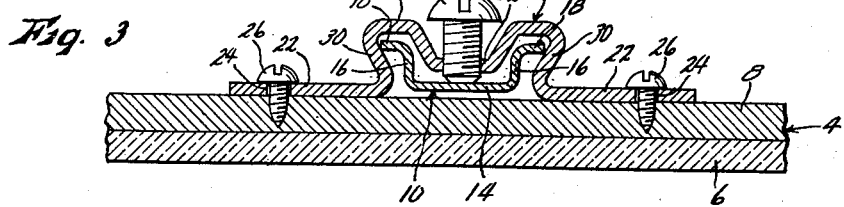

With these objects in view, as well as other objects which will appear in the course of the specification, reference will be had to the drawing, wherein:

Fig. 1 is a rear elevational view of a dresser or the like showing a mirror attached thereto by means of a mounting embodying the present invention, Fig. 2 is an enlarged fragmentary detail view taken from Fig. 1 and showing one of the standards and one of the brackets, and Fig. 3 is a sectional view taken on line III—III of Fig. 2.

Like reference numerals apply to similar parts throughout the several views, and the numeral 2 applies to a furniture piece such as a dresser, dressing table, buffet, chest of drawers or the like, and which for convenience will be designated a dresser, and the numeral 4 applies to a mirror assembly comprising a planar mirror 6 and its backing 8. The mounting structure by which said mirror assembly is attached to dresser 2 comprises one or more standards 10 and a plurality of brackets 12 associated therewith.

Each of standards 10 comprises an elongated channel having a central web 14, an upstanding side wall 16 at each edge of said web, and an out-turned flange 18 at the upper edge of each of said side walls, said flanges lying in a plane substantially parallel to web 14. Said standards are disposed vertically, and each is attached at its upper end to mirror backing 8 by means of a single screw 20. Each standard extends downwardly through a set of three brackets 12, one of said brackets being affixed to mirror backing 8 adjacent the lower edge thereof, and two of said brackets being affixed to the back of dresser 2.

Each of brackets 12 comprises a strap of metal formed as best shown in Figs. 2 and 3, having coplanar end sections 22 each perforated at 24 to receive a screw 26 by which the bracket is affixed to mirror backing 8 (or dresser 2), and an intermediate section 28 offset outwardly from end sections 22 and connected thereto by outwardly divergent legs 30. Thus a dovetail space is formed between bracket legs 30, and standard 10 is inserted slidably in said space as shown, the width of the standard across flange 18 being less than the maximum spacing between legs 30, but greater than the minimum spacing between said legs. The central portion 32 of intermediate section 28 of the bracket is offset inwardly to project within channel 10, and a screw 34 threaded through central portion 34 abuts at its inner end against the web 14 of the channel.

Thus it will be seen that when screw 34 is tightened, flange 18 of the channel will be forced firmly against the inclined legs 30 of the bracket, and the channel will be clamped rigidly against movement in the bracket. It will be seen in Fig. 3 that the thickness of channel 10 is such that it is at all times contained entirely within the dovetail space between legs 30, and cannot engage mirror backing 8 (or the dresser). Thus the tightening of screw 34 cannot exert any force tending to loosen screws 26. At the same time, the slight transverse flexing of channel 10 which is induced by the screw holds said channel firmly and resiliently against the end of the screw, and minimizes any possibility that the screw might be loosened accidentally by vibration or the like. The inward offset of bracket portion 32 reduces the projection of the mounting rearwardly from the mirror to such an extent that if a room is provided with a normal baseboard, the dresser may be pushed against the baseboard with no danger that screws 34 will damage or gouge the wall. It will be apparent that the adjustability of the bracket 12 on mirror backing 8 permits adaptability of the mounting to mirrors of different heights, and that the adjustability of the standards in the brackets 12 affixed to the dresser permits adjustment of the elevation of the mirror above the dresser.

While I have shown and described a specific embodiment of my invention, it will be apparent that many minor changes of structure and operation could be made without departing from the spirit of the invention as defined by the scope of the appended claims.

What I claim as new and desire to protect by Letters Patent is:

1. In a mirror mounting of the class described, a standard comprising an elongated channel having out-turned flanges along the open side thereof, and a bracket comprising a strap having coplanar end sections adapted to be affixed to the backing of said mirror and an intermediate section offset outwardly from said end sections and connected thereto by outwardly divergent legs, said standard being inserted slidably between said legs in outwardly opening relation and having a width across the flanges thereof intermediate the maximum and minimum spacing between said inclined legs, and a clamp member carried movably by the intermediate section of said bracket and operable to be forced into abutting contact with the web of said standard channel.

2. The structure as recited in claim 1 wherein the overall thickness of said standard channel, normal to the web thereof, is substantially less than the depth of the space between said inclined bracket legs, whereby the web of said channel is spaced at all times outwardly from the plane of said bracket end sections.

3. The structure as recited in claim 1 wherein said channel comprises a web, side walls extending outwardly from said web and spaced apart a distance less than the minimum distance between said bracket legs, and an out-turned flange at the free edge of each of said side walls, the width of said channel across said flanges being intermediate the maximum and minimum spacing between said inclined bracket legs, thereby providing line contact only between said standard and said bracket, whereby said standard channel may be flexed transversely by said clamp member.

4. The structure as recited in claim 1 wherein the overall thickness of said standard channel, normal to the web thereof, is substantially less than the depth of the space between said inclined bracket legs, whereby the web of said channel is spaced at all times outwardly from the plane of said bracket end sections, and wherein said channel comprises a web, side walls extending outwardly from said web and spaced apart a distance less than the minimum distance between said bracket legs, and an out-turned flange at the free edge of each of said side walls, the width of said channel across said flanges being intermediate the maximum and minimum spacing between said inclined bracket legs, thereby providing line contact only between said standard and said bracket, whereby said standard channel may be flexed transversely by said clamp member.

5. The structure as recited in claim 1 wherein the central portion of said intermediate bracket section is offset inwardly to project within said standard channel, and wherein said clamp member is carried by said offset portion, whereby to reduce the overall thickness of said mounting.

References Cited in the file of this patent

UNITED STATES PATENTS

| | | |
|---|---|---|
| 2,313,532 | Garrett | Mar. 9, 1943 |
| 2,607,553 | Garrett | Aug. 19, 1952 |
| 2,688,901 | Haugaard | Sept. 14, 1954 |
| 2,694,543 | Norris | Nov. 16, 1954 |

FOREIGN PATENTS

| | | |
|---|---|---|
| 423,105 | Italy | Dec. 31, 1946 |